3,288,625
OPTICAL DEVICE HAVING AN INFRARED RADIATION TRANSMITTING AND VISIBLE RADIATION REFLECTING LAYER OF LANTHANUM HEXABORIDE

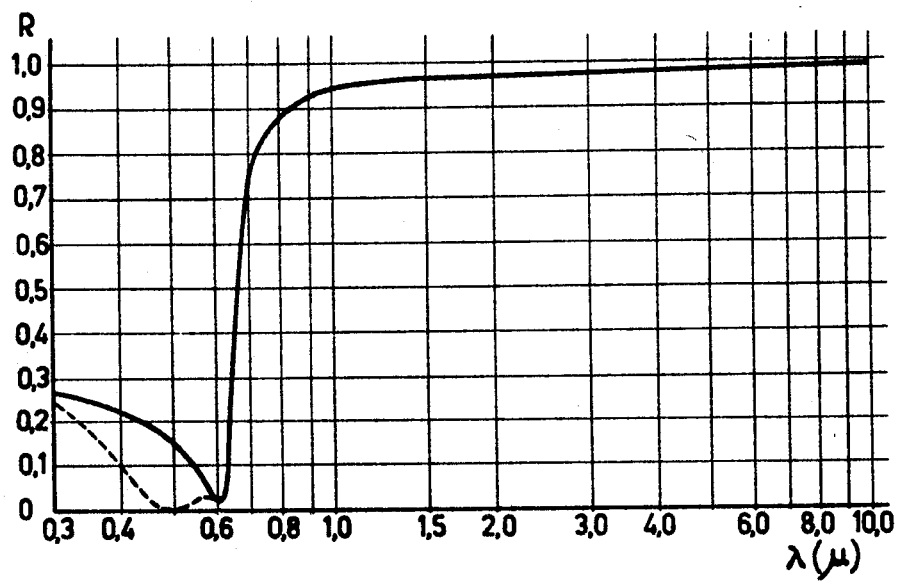

Erhard Kauer, Aachen, Germany, assignor to North American Philips Company, Inc., New York, N.Y., a corporation of Delaware
Filed May 13, 1964, Ser. No. 367,039
Claims priority, application Germany, May 24, 1963, N 23,220
4 Claims. (Cl. 117—33.3)

The invention relates to heat reflecting mirrors and filters having a low reflectivity for visible rediation.

The separation of heat radiation from visible light is a problem frequently met with in technology. The heat radiation emitted by sources of light, for example, is generally considered inconvenient. Firstly it is the cause of the comparatively low efficiency of the sources of light and secondly it frequently gives rise to undesirable side effects, for example, the heating of irradiated articles, for example, in projection lamps and the like, which one would like to use with high intensities of the visible light radiation without the films or diapositives being damaged by the heat radiation.

In lamps for medical irradiation, drying lamps and the like it is frequently desirable to use high intensities of heat radiation without being dazzled by visible radiation. Generally absorption filters, reflection filters or transmission filters are used for separating various radiation components.

Absorption filters usually consist of colored glass which absorbs not only the visible light but also the wavelengths exceeding approximately $2.7\mu$. The two absorption ranges produce a not inconsiderable heating of the filters.

Reflection and transmission filters may be built from dielectric multiple layers. Owing to the stringent requirements with respect to accuracy which the individual layers have to satisfy the manufacture of such filters is very expensive.

The metals of high reflectivity such as, for example, aluminum and silver have only a poor selectivity in this respect, they reflect the visible light in substantially the same degree as the infra-red radiation. Even mirrors of gold, which in this respect are best, for a wavelength $\lambda$ of 555 m$\mu$ (maximum of the sensitivity of the human eye) reflect about 80% of the visible radiation produced.

Heavily doped layers of $SnO_2$ are highly translucent but they only have a satisfactory reflectivity for infra-red radiation of comparatively long wavelength. Hence they are suitable for low-temperature radiators, for example sodium vapour lamps, but unsuitable for the usual incandescent light sources in which the radiation has a maximum at about $1\mu$. It has now been found that lanthanum hexaboride ($LaB_6$) eminently possesses the desirable properties.

The mirrors and filters according to the invention are therefore characterized in that the optically active layer consists of lanthanum hexaboride.

The invention will now be described more fully with reference to the drawing which shows the spectral variation of the reflection of a $LaB_6$ mirror.

In reflection the mirrors and filters according to the invention show a dark-violet coloration, which may be explained with reference to the spectral variation of the reflection shown in the sole figure of the drawing. In the figure the curve shows the reflectivity of a $LaB_6$ mirror as a function of the wavelength of the incident radiation. It will be seen that at the maximum of the sensitivity of the eye the mirror has a reflectivity of only about 7% whereas infra-red radiation is reflected in a high degree of already about 80% for a radiation having a wavelength of $0.7\mu$ (near infra-red). The sharpness of the transition from the transmission range to the reflection range nearly corresponds to that of an interference filter. With decreasing wavelength the reflectivity increases again and reaches a value of about 20% at $0.4\mu$.

This reflection generally will not inconveniently manifest itself since sources of infra-red radiation emit little energy in the said range of the spectrum. If the reflection should be inconvenient, it may be eliminated in known manner by coating with a dielectric layer preferably having an optical thickness of $\lambda/4$. If the reduction in reflectivity is effected for a wavelength of, for example, $0.5\mu$, which may be performed by a layer of $CaF_2$, $TiO_2$ and similar materials known for this purpose having an index of refraction between about 1.4 and 1.7, the reflectivity is small for adjacent wavelengths also and approximately corresponds to the curve shown by a broken line in FIGURE 1. The reflectivity in the infra-red region is hardly affected by such an anti-reflex layer, especially if the zero order ($\lambda/4$ layer) is used.

In electric incandescent lamps, such as projection lamps and the like, of suitable geometry a considerable improvement of the efficiency may be achieved by coating the wall of the bulb with a layer of $LaB_6$. By this layer the heat rays are reflected upon the filament and hence the energy supplied to the filament may be correspondingly reduced.

The mirrors and filters according to the invention may be manufactured by various methods. $LaB_6$ or its components may be deposited from the vapor phase in a high vacuum and alternatively layers of lanthanum deposited from vapor may be borinated, or be manufactured by simple or reactive cathode sputtering. Self-supporting mirrors may be manufactured by sintering $LaB_6$ in the desired shape under pressure. The $LaB_6$ layers may be provided on glass, quartz, ceramic materials, synthetic materials and other materials and used in reflection filters, mirrors and transmission filters. The thickness of the optically active layer must be at least about $0.2\mu$ and for transmission filters must not exceed $0.6\mu$.

The mere presence of a layer of $LaB_6$ generally is not sufficient to ensure satisfactory filter action, especially no high infra-red reflection. An additional requirement is that the layer has no excessively fine crystalline structure in order that the electric conductivity approximates as closely as possible to that of the solid $LaB_6$ material. Such a structure may be obtained when during the production of the layer the support is maintained at the highest possible temperature, for example, at a temperature just below the softening or melting point of the support. Alternatively a layer produced at a low temperature may be subjected to a thermal after-treatment. As a measure of the quality of the layer use may be made of the surface resistance which should be less than 50 ohms, preferably even less than 20 ohms, at the given values of the thickness of the layer. This ensures that the absorption in the visible range is maintained small while retaining the high infra-red reflection.

What is claimed is:
1. An optical device comprising a substrate provided with a coating of an infra-red reflecting layer having a low reflectivity for visible radiation, said layer being constituted of lanthanumhexaboride.
2. An optical device as claimed in claim 1, wherein said layer of lanthanumhexaboride has a thickness between $0.2\mu$ and $0.6\mu$.
3. An optical device as claimed in claim 2 wherein said layer has an electrical surface resistance of less than 50 ohms, and the minimum surafce resistance is the surface resistance of a monocrystal of lanthanumhexaboride.
4. An optical device as claimed in claim 1 and further comprising a second layer on said substrate of dielectric material to enhance the transmittance of the device for visible radiation.

References Cited by the Examiner

UNITED STATES PATENTS 3,099,403 7/1963 Strawick _____ 88—105 X
3,209,188 9/1965 Freeman _____ 313—112 X

OTHER REFERENCES

"Optical Constants of $LaB_6$ and $CeB_6$," by B. M. Tsarev et al., from Poroshkovaya Met., Akad. Nauk Ukr. SSR, vol. 2, 1962, pp. 85–88.

RALPH G. NILSON, *Primary Examiner.*

W. F. LINDQUIST, *Assistant Examiner.*

UNITED STATES PATENT OFFICE
CERTIFICATE OF CORRECTION

Patent No. 3,288,625                                         November 29, 1966

Erhard Kauer

It is hereby certified that error appears in the above numbered patent requiring correction and that the said Letters Patent should read as corrected below.

In the heading to the drawing and printed specification, title of invention should appear as shown below instead of as in the patent:

OPTICAL DEVICE HAVING AN INFRARED REFLECTING AND VISIBLE
    RADIATION TRANSMITTING LAYER OF LANTHANUM HEXABORIDE

Signed and sealed this 12th day of November 1968.

(SEAL)
Attest:

Edward M. Fletcher, Jr.                                    EDWARD J. BRENNER
Attesting Officer                                                Commissioner of Patents